United States Patent [19]

Finke et al.

[11] 4,310,679

[45] Jan. 12, 1982

[54] EQUILIBRATING ORGANOSILOXANES WITH FLUORINE- AND SULPHONYL-CONTAINING CATALYSTS

[75] Inventors: Ulrich Finke, Ettlingen; Hans-Heinrich Moretto, Cologne, both of Fed. Rep. of Germany

[73] Assignee: Bayer Aktiengesellschaft, Leverkusen, Fed. Rep. of Germany

[21] Appl. No.: 212,392

[22] Filed: Dec. 3, 1980

[30] Foreign Application Priority Data

Dec. 21, 1979 [DE] Fed. Rep. of Germany ....... 2951801

[51] Int. Cl.³ .............................................. C07F 7/08
[52] U.S. Cl. .................................................. 556/462
[58] Field of Search ........................................ 556/462

[56] References Cited

U.S. PATENT DOCUMENTS 2,779,776 1/1957 Hyde et al. ...................... 556/462 X
4,122,247 10/1978 Evans .............................. 556/462 X

*Primary Examiner*—Paul F. Shaver
*Attorney, Agent, or Firm*—Sprung, Felfe, Horn, Lynch & Kramer

[57] ABSTRACT

In the preparation of equilibration products of organosiloxanes by contacting at least one organosiloxane with a cation exchange resin, the improvement which comprises employing as said resin a polymer having side chains carrying sulphonyl groups, the carbon atoms carrying the sulphonyl groups also carrying at least one fluorine atom.

2 Claims, No Drawings

EQUILIBRATING ORGANOSILOXANES WITH FLUORINE- AND SULPHONYL-CONTAINING CATALYSTS

The present invention relates to a process for the preparation of equilibrated organopolysiloxanes by rearrangement of siloxanes using a cation exchanger in which the sulphonic acid group is bonded to a C atom which in turn carries at least one fluorine atom.

It is known that organopolysiloxanes can be prepared by rearrangement reactions, the silicon-oxygen-silicon bonds being rearranged virtually arbitrarily. Rearrangement reactions of organopolysiloxanes are catalyzed by strong bases and strong acids. The siloxane rearrangements catalyzed by strong acids and strong bases are frequently used in the industrial preparation of organopolysiloxanes with a relatively high molecular weight from organosiloxanes with a relatively low molecular weight, and vice versa.

The catalysts hitherto used are strong bases, such as alkali metal bases (for example lithium oxide, sodium hydroxide, potassium alkoxides, potassium silanolates, cesium hydroxide and the like), quaternary bases, such as tetraalkylammonium hydroxides and alkoxides and tetraalkylphosphonium hydroxides and alkoxides and the like, and strong acids, such as complex Lewis acids, hydrogen halide acids, sulphuric acid, boric acid, trifluoromethylsulphonic acid and the like. Certain acids on supports, such as carbon treated with acid, silicates treated with acid, clays treated with acid and synthetic "gel-like" cation exchanger resins, have also already been described as suitable catalysts for rearrangement of siloxane bonds. Macro-crosslinked cation exchanger resins of certain pore volume have also already been proposed.

However, each of the abovementioned catalysts imposes limitations on the process which, surprisingly, can be avoided when the catalyst according to the invention is used.

The present invention thus relates to a process for the preparation of equilibration products of organosiloxanes by rearrangement of siloxane bonds on a cation exchanger resin, characterized in that the starting material employed as the organosiloxane or organosiloxane mixture is brought into contact, at a temperature of about 0° C. to about 225° C., with a fluorine-containing polymer which acts as a cation exchanger and has, as ion-exchanging points, side chains containing sulphonyl groups, the sulphonyl groups each being bonded to a carbon atom carrying at least one fluorine atom.

The cation exchangers according to the invention do not belong to the class of macroporous cation exchangers since they do not have the pore volume, which can be determined with mercury, which is typical for this class of compound.

The decisive advantage of the process according to the invention is, above all, an extremely high reactivity is achieved with the catalysts employed. The equilibration of dimethylsiloxane in the presence of the catalysts mentioned takes place at a rate which is about 10 times greater than that achieved with the cation exchangers known hitherto or with other known catalysts.

Moreover, these catalysts lead to higher space/time yields, and furthermore these can be realized at lower temperatures (lower energy costs). The process according to the invention thus presents considerable possibilities from an economic point of view. The stability to heat and chemicals of the new catalyst used according to the invention is also superior to that of macroporous ion exchangers prepared on the basis of divinylbenzene/styrene. These ion exchangers cannot be used in the temperature range above 120° C. (at most 150° C.), since they lose their structure and thus their activity. The same applies to their service lives, which are only a few days at temperatures of, for example, 100° C. In contrast, the catalysts according to the invention are stable at 100° C. for months.

Compared with the "mobile" catalysts, such as, for example, alkali metal bases, KOH, CsOH, quaternary bases, such as tetraalkylammonium hydroxide, and strong acids, such as sulphuric acid and trifluoromethylsulphonic acid, the catalyst according to the invention provides the advantages of simplification of the process, a saving in costs and an improvement in the quality of the product. The catalysts used at present as a rule necessitate the process step of chemical neutralization, which leads to salt formation. Certain applications of polyorganosiloxanes, for example used as electrical insulating oils, require a pure, salt-free silicone product. This removal of the salts formed by the neutralization is thus necessary. In contrast, if the catalysts according to the invention are used, the process step of neutralization and the removal of salts associated therewith are eliminated. The catalyst according to the invention is either fixed in the reactor or it is retained by built-in fitments (sieves). Continuous processes can thus be particularly advantageously carried out with the catalyst according to the invention.

In addition to the preparation of polydimethylsiloxanes (polymerization and depolymerization), the preferred field of use is the synthesis of polymers containing Si-H and/or Si-Vi, the former not being producible by alkaline polymerization and having been hitherto prepared, for example, with sulphuric acid as the catalyst.

The organosiloxanes which can be equilibrated with the catalyst according to the invention comprise a wide field of organosiloxanes; thus, in principle, all organosiloxanes which, by reaction with the cation exchanger according to the invention, do not lead to undesired side reactions or to inactivation of the cation exchanger can be employed.

In addition to the equilibrating reaction, other desired reactions, such as, for example, condensations of silanols, can also be realized with the catalysts according to the invention. In this case, it must be ensured that the water formed, which inhibits the equilibrating action of the catalyst, is removed by adjusting the temperature or reducing the pressure.

Suitable catalysts which can be employed in the process according to the invention are described, for example, in German Auslegeschrift 1,595,071 or in U.S. Pat. No. 3,041,317, U.S. Pat. No. 3,282,875, U.S. Pat. No. 3,560,568 and U.S. Pat. No. 3,718,627. A copolymer of tetrafluoroethylene and perfluorosulphonylethoxypropyl vinyl ether which is converted hydrolytically from the acid fluoride form into the sulphonic acid is a particularly suitable material. Such products are available, for example, under the tradenames ®"Nafion" (Messrs. DuPont).

The catalysts to be employed according to the invention can be used, for example, in powder form or in the form of films, tubes or the like.

The invention is not restricted to a certain group of organopolysiloxanes and can be applied to all organosiloxanes in which the organosiloxanes are a mixture or a single compound from the group containing at least one structure of the formula:

$$(Y)_a SiO_{4-a}$$ (I)

wherein
Y is hydrogen, a substituted or unsubstituted monovalent hydrocarbon group or a divalent hydrocarbon group and
a has a value from 1 to 3 inclusive.

Y preferably contains 1 to about 30 carbon atoms. The groups represented by Y can be identical or different in a given siloxane unit.

Examples of unsubstituted monovalent hydrocarbon groups Y in formula I are alkenyl groups (for example vinyl and allyl groups), alkyl groups (for example methyl, ethyl, pentyl and 2-ethylhexyl groups), aryl groups (for example phenyl, 2-naphthyl, 2-anthracyl and biphenyl groups), cycloalkyl groups (for example cyclohexyl and cyclooctyl groups), alkaryl groups (for example 4-methylphenyl, 2,4-diethylphenyl and 4-dodecylphenyl groups), aralkyl groups (for example benzyl and phenethyl groups), cycloalkenyl groups (for example cyclohexenyl groups), alkoxy groups (such as methoxy, ethoxy, propoxy, dodecyloxy and isopropoxy groups), aryloxy groups (such as phenoxy, naphthyloxy and biphenyloxy groups) and acyloxy groups (such as acetoxy groups).

Examples of the substituted monovalent hydrocarbon groups Y in formula I are alkenyl, cycloalkenyl, alkyl, aryl, aralkyl, alkaryl and cycloalkyl groups with halogen, cyano, ester (for example alkoxy, aryloxy, carbalkoxy and acyloxy), epoxy and polyoxyalkylene substituents. Such groups Y are also tetrafluoroethyl, trifluorovinyl, chloromethyl, γ-chloropropyl and β-carbethoxyethyl groups, the group MeOOC(CH$_2$)$_{10}$-, γ-carbopropoxypropyl groups, CH$_3$COOCH$_2$CH$_2$— groups, and the groups

CH$_2$=COCOOCH$_2$CH$_2$CH$_2$— and $$\underset{\underset{CH_2=C-COOCH_2CH_2CH_2-}{|}}{CH_3}$$

Examples of divalent hydrocarbon groups Y in formula I are alkylene groups (such as methylene, ethylene, n-propylene, n-butylene, 2,2-dimethyl-1,3-propylene and decylene groups), arylene groups (such as phenylene and p,p'-diphenylene groups), alkarylene groups (such as the phenylethylene group) and alkylenearalkylene groups (such as the symmetric —CH$_2$CH$_2$(C$_6$H$_4$)CH$_2$CH$_2$— group and the symmetric —CH$_2$C$_6$H$_4$CH$_2$— group). The divalent hydrocarbon group is preferably an alkylene group which contains 2 to 4 consecutive carbon atoms.

As already mentioned, the invention is not restricted to a certain class or group of organopolysiloxanes, but is broadly applicable to all classes and types, such as those which are described by the formula:

$$X_m SiO_{\frac{4-m-n}{2}}^{Z_n}$$ (II)

wherein
X is a hydrogen atom, a monovalent hydrocarbon group with 1 to 18 carbon atoms, or a monovalent hydrocarbon group with 1 to 18 carbon atoms substituted by at least one mercapto, carboxyl, carbalkoxy, alkenyloxy, epoxy, cyano, fluorine, chlorine, bromine, polyoxyalkylene, alkoxy or aryloxy radical,
Z is —N or —OX,
m is an integer from 0 to 3,
n is an integer from 0 to 3 and
m+n is an integer from 1 to 3,
and X and Z in each unit and in each molecule can be identical or different.

The organopolysiloxanes according to the invention contain in their molecules units —SiO$_{3/2}$= SiO$_{2/2}$ and =SiO$_½$ and groups of the formula II or mixtures of two or more such units. These organopolysiloxanes can also contain quadrivalent units SiO$_{4/2}$ in addition to the units mentioned.

Typical groups X are alkyl groups (for example methyl, ethyl, pentyl, dodecyl, octadecyl and 2-ethylhexyl groups), aryl groups (such as phenyl, 2-naphthyl, 2-anthracyl and biphenyl groups), alkaryl groups (such as 4-methylphenyl, 2,4-diethylphenyl and 4-dodecylphenyl groups), aralkyl groups (such as benzyl, β-phenylethyl, β-phenylpropyl, γ-phenylpropyl, β-phenylpropyl, δphenylbutyl, β-phenylbutyl, ortho-methylphenylethyl, para-tert.-butylphenylethyl and para-ethylphenylethyl groups), alkoxy groups (such as methoxy, ethoxy, propoxy, dodecyloxy and isopropoxy groups), aryloxy groups (such as phenoxy, naphthyloxy and biphenyloxy groups) and acyloxy groups (such as methacyloxy groups); or substituted alkyl groups, for example β-cyanoethyl, β[(polyoxyethylene)ethoxy]ethyl, β-phenoxyethyl, β-phenylethyl, β-phenyl-n-propyl, 3,3-dimethyl-n-butyl, 3,3,3-trifluoropropyl, β-cyanopropyl, γ-t-butoxypropyl and γ-cyano-α-methyl-n-butyl groups; cycloalkyl groups, for example cyclopentyl, cyclohexyl and cycloheptyl groups, alkenyl and substituted alkenyl groups, for example vinyl, alkyl, β-phenylvinyl and 3-cyclohexenyl groups; substituted aryl groups, for example 4-cyanophenyl and dibromophenyl groups; substituted alkaryl groups, for example 4-trifluoromethylphenyl groups, and substituted alkaralkyl groups, such as the β-(trifluoromethylphenyl)ethyl group.

Typical hydrolyzable groups Z are alkoxy groups (such as methoxy, ethoxy, propoxy, dodecyloxy and isopropoxy groups), aryloxy groups (such as phenoxy, naphthyloxy and biphenyloxy groups) and acyloxy groups (such as acetoxy groups).

Organosiloxanes which can be used, according to the invention, for the rearrangement are to be found, in particular, in a broad range of linear and cyclic compounds or mixtures thereof, such as
(a) linear compounds $$R_3Si(OSiR_2)_pOSiR_3$$

wherein
R is hydrogen or a monovalent organic radical, such as an alkyl, arylalkyl, alkylaryl, alkenyl, alkoxy, acyloxy or organosiloxy group and
p has the value O or is a positive integer,
and
(b) cyclic compounds of the formula $(R_2SiO)_q$ in which
q is a positive integer greater than 2 and
R has the meaning given.

Examples of groups R contained in siloxanes which can be used according to the invention are hydrogen and organic radicals, such as alkyl groups (for example methyl, ethyl, pentyl, dodecyl, octadecyl and 2-ethylhexyl groups), aryl groups (such as phenyl groups), aralkyl groups (such as the phenylmethyl group), alkoxy groups (such as methoxy, ethoxy, propoxy, dodecyloxy and isopropoxy groups), aryloxy groups (such as phenoxy groups), acyloxy groups (such as the methacryloxy group) and organosiloxy groups (such as dimethylsilyloxy and trimethylsiloxy groups).

Organosiloxanes which can be used according to the invention include, in particular, linear and cyclic compounds and mixtures thereof or a member of the group comprising the following compounds:
(a) linear compounds of the formula $R'_3Si(OSiR'_2)_pOSiR'_3$ in which
R is hydrogen or a monovalent substituted or unsubstituted hydrocarbon radical with 1 to 18 carbon atoms and
p is O or a positive integer,
and
(b) cyclic compounds of the general formula $(R'_2SiO)_q$ in which
q is a positive integer greater than 2 and
R' has the meaning given.

Examples of suitable groups R' are alkyl groups (for example methyl, ethyl, pentyl, dodecyl, octadecyl and 2-ethylhexyl groups), aryl groups (such as phenyl, 2-naphthyl, 2-anthracyl and biphenyl groups), alkaryl groups (such as 4-methylphenyl, 2,4-diethylphenyl and 4-dodecylphenyl groups) and aralkyl groups (such as phenylmethyl groups).

Further examples of R' are the groups R' mentioned with halogen atoms or mercapto groups as substituents.

The organosiloxanes which can be used according to the invention are preferably free from siloxy-ester bonds, such as silylalkoxy or silylacyloxy groups, but they can optionally contain such groups.

There is no restriction with regard to the molecular weight of the organosiloxanes which can be used according to the invention. The sole restriction in practice on the feed mixture consists in the viscosity, which should permit flow through any resin bed present, during which high pressure losses over the cross-section should be avoided. The viscosity can, of course, be controlled by exact measuring out of the solvent. It has been found that feed mixtures of organosiloxanes with viscosities of up to about 10,000 cP produce practical results and viscosities above 10,000 cP are regarded as being unsuitable for use in the process, but are not necessarily so.

The process conditions for carrying out the invention are not critical within narrow limits. The reaction temperature is about 0° to about 225° C. under atmospheric pressure. Lower temperatures can optionally be used, but provide no substantial advantage. The reaction can be carried out under atmospheric pressure, but pressures above or below atmospheric pressure can also optionally be used.

The siloxane rearrangement is a reversible process, that is to say organopolysiloxanes with a low molecular weight can be converted into high polymers and, in reverse, high polymers can be converted into siloxane compounds with a low degree of polymerization. Such rearrangement reactions are continued in the presence of a suitable rearrangement catalyst until an equilibrium mixture of various siloxanes has been formed. For example, in the case of systems which consist predominantly of diorganosiloxy units with or without triorganosiloxy units, such equilibrium mixtures in general contain a relatively small amount of cyclic siloxanes, and linear siloxanes with a relatively high molecular weight. However, the proportion of cyclic siloxanes in the equilibrium mixture varies from system to system, depending chiefly on the nature of the organic substituents on the silicon atom of the siloxane to be rearranged. As long as substances which have a catalytic action on the rearrangement remain in the system, cyclic siloxanes, which are removed from the system, interfere with the equilibrium and further rearrangement occurs, which contributes to the replenishment of the amount of cyclic substances removed and establishes an equilibrium again. If desired, continuous removal of the cyclic substances can consume most or virtually all of the siloxane in the system. Dilution of the system with a solvent likewise promotes the bonding of cyclic substances in the equilibrium mixture. If, on the other hand, the catalyst becomes inactive, when the equilibrium mixture has been achieved or during the rearrangement before or after the equilibrium mixture has been achieved it is possible to remove relatively low-boiling substances, including cyclic substances, by extraction with a solvent, by rinsing out or by stripping off in vacuo, without further formation of cyclic substances.

High-molecular organopolysiloxanes can be depolymerized in solvanted form. Decrease in the siloxane concentration in a feed mixture by addition of a diluent produces a rise in the ratio of cyclic rearranged structures to linear rearranged structures. The mean average molecular weight of the linear rearranged organopolysiloxanes will also decrease as the ratio of cyclic to linear structures increases.

Solvents which are suitable as diluents in the process according to the invention are any inert organic solvents. The solvent chosen depends on the organosiloxane used. Non-hygroscopic organic solvents, including, for example, aromatic hydrocarbons, such as xylene, toluene, benzene and naphthalene, and aliphatic hydrocarbons, such as n-hexane, n-octane, n-nonane, n-dodecane and white spirit, are preferred in most cases. Hygroscopic solvents, such as ethers (for example diethyl ether, di-n-butyl ether, tetrahydrofuran and dioxane), amides (for example N,N-dimethylformamide and N,N-dimethylacetamide), ketones (for example acetone, dimethyl ketone, methyl ethyl ketone and methyl isobutyl ketone) and esters (for example ethyl acetate, isopropyl acetate, isobutyl acetate and methyl propionate) can be used if suitable drying or dehydration operations are envisaged.

An embodiment of the invention relates to the rearrangement, or more precisely the equilibration, of organopolysiloxanes with a low molecular weight, in particular volatile organopolysiloxanes, organosiloxanes with a higher molecular weight, such as oils, rubber-like products and resins, being formed ... in order to separate off the organopolysiloxanes which are no longer volatile.

Another embodiment of the invention relates to the rearrangement, or more precisely the depolymerisation, of solvated high-molecular organopolysiloxanes, low-boiling organosiloxanes, such as volatile substances and light oils, being formed. The substances flowing out of the reaction zone can be distilled or fractionated in order to separate off the volatile substances and/or the fractions with a medium boiling range.

The invention can readily be carried out in a continuous manner, the feed mixture, which consists of organosiloxanes in solvated form or as pure substances and is kept at a constant temperature by heat exchange devices, being passed through a horizontal or vertical ion exchanger resin bed in which the siloxane rearrangement takes place. The substances flowing out of the bed are then subjected to chemical separation processes, such as stripping off of the solvent, flash distillation, fractional distillation and/or solvent extraction, in order to separate off the fraction containing the desired product. The undesired fractions are then recycled into the process circulation for renewed processing. Regeneration of the catalyst can optionally be effected by providing parallel beds, which can be bridged, to permit continuity of the process.

The process according to the invention is illustrated in more detail in the following examples (unless indicated otherwise, % data denote % by weight).

The catalyst used in the examples is a commercially available product (copolymer of tetrafluoroethylene and perfluorosulphonylethoxypropyl vinyl ether) obtainable under the name ®"Nafion"- Powder 501 from Messrs. DuPont. This catalyst is converted from the alkali metal salt into the acid form by repeated treatment with 1 N HCl and, after washing with distilled water, is dried at 80° C. under an oil pump vacuum.

EXAMPLE 1

Experiment 1:

(comparison)

2.46 g of $(Me_3Si)_2O$ and 97.54 g of octamethylcyclotetrasiloxane are added to 5 g of a macroporous cation exchanger (SPC 118) with 18% of divinylbenzene units and sulphonic acid groups (4.35 m equivalents/g) at 80° C. and the refractive index is followed until equilibrium is reached. The equilibrium refractive index ($n_D^{20}$: 1.4041) is achieved after 60 minutes.

Experiment 2:

2.46 g of $(Me_3Si)_2O$ and 97.54 g of octamethylcyclotetrasiloxane are added to 0.9 g of ®Nafion Powder 501 ($SO_3H$) (0.8 m equivalent/g) at 80° C. The equilibrium refractive index ($n_D^{20}$: 1.4041) is likewise achieved after about 60 minutes. The rate of reaction is thus 30 times greater in the case of Nafion Powder 501 than in the case of the macroporous cation exchanger tested.

EXAMPLE 2

70 ml of a mixture of 2 g of $M_2$ $M=(CH_3)_3$ $SiO_{\frac{1}{2}} D=(CH_3)_2SiO$ $D^H=CH_3SiHO$ $D^{VI}=CH_3SiCH=CH_2O$ $Me=CH_3$— and 58 g of $D_4$ per hour are passed through a reactor, 390 cm² in capacity, at 100° C. in a continuous reaction operation for 40 days. The decrease in catalyst activity (for the catalyst, see Example 1), measured by the volatile constituents (165° C./2 mm Hg) of the reaction mixture rises from 25% only to 30%. Under the same reaction conditions but using macroporous cation exchangers, the activity of the catalyst is exhausted after 3 days.

EXAMPLE 3

5 g of Nafion Powder 501 are added to 100 g of $HM_2D_{5.5}{}^HD_{2.2}VI$ and 62.4 g of $D_4$ at 50° C. and the mixture is stirred for 6 hours. The catalyst is then filtered off and the volatile constituents are stripped off in vacuo. The viscosity, refractive index and chemical properties of the reaction product correspond to those of products prepared by the perfluoroalkanesulphonic acid equilibration process. In contrast to these products, the reaction product is free from salts and is prepared without additional neutralization steps.

EXAMPLE 4

120 ml of a mixture of hexamethyldisiloxane and octamethylcyclotetrasiloxane in a molar ratio of 1 to 1,000 per hour are fed, with 5 g of catalyst (Nafion Powder 501) into a reactor, with a capacity of 85 ml, at 75° C. in a continuous reaction operation. The product is freed from volatile constituents at 160° C./2 mm Hg. The volatile constituent comprises 40.2%. The resulting polydimethylsiloxane has a viscosity of 166,780 mPas, which corresponds to a chain length of about 1,500 dimethylsiloxy units.

It will be appreciated that the instant specification and examples are set forth by way of illustration and not limitation, and that various modifications and changes may be made without departing from the spirit and scope of the present invention.

We claim:

1. In the preparation of equilibration products of organosiloxanes by contacting at least one organosiloxane with a cation exchange resin, the improvement which comprises employing as said resin a polymer having side chains carrying sulphonyl groups, the carbon atoms carrying the sulphonyl groups also carrying at least one fluorine atom.

2. A process according to claim 1, wherein the organosiloxane comprises at least one compound of the average formula $$Y_a Si(O_{4-a})$$

wherein

Y is hydrogen, or a substituted or unsubstituted monovalent or divalent hydrocarbon radical with up to 30 carbon atoms, and a is 1, 2 or 3.

* * * * *